United States Patent [19]

Asano

[11] Patent Number: 5,386,636
[45] Date of Patent: Feb. 7, 1995

[54] STORAGE DEVICE FURNISHED WITH SAFETY FUNCTION

[75] Inventor: Kazunori Asano, Kamakura, Japan

[73] Assignee: Kato Hatsujo Kaisha, Ltd., Kanahawa, Japan

[21] Appl. No.: 28,160

[22] Filed: Mar. 9, 1993

[30] Foreign Application Priority Data

Mar. 16, 1992 [JP] Japan ................... 4-022207

[51] Int. Cl.$^6$ ................ E05C 3/06; B60N 3/12; A47B 88/00
[52] U.S. Cl. .................... 312/319.2; 312/333; 292/201; 296/37.12
[58] Field of Search ............ 312/319.1–319.2, 312/333; 292/201, DIG. 22, DIG. 4, 80; 296/37.12

[56] References Cited

U.S. PATENT DOCUMENTS

| 3,132,892 | 5/1964 | Stevens | 296/37 |
| 3,189,374 | 6/1965 | Mertes | 292/80 |
| 3,854,785 | 12/1974 | Hunt et al. | 312/319.1 |
| 4,355,837 | 10/1982 | Shimizu et al. | 296/37.12 |
| 4,552,399 | 11/1985 | Atarashi . | |
| 4,657,292 | 4/1987 | Bruck . | |

FOREIGN PATENT DOCUMENTS 2-25332  2/1990  Japan .

*Primary Examiner*—Stephen C. Pellegrino
*Assistant Examiner*—Nancy Mulcare
*Attorney, Agent, or Firm*—Wenderoth, Lind & Ponack

[57] ABSTRACT

A storage device furnished with a safety function includes a housing, a storage cabinet movably supported inside the housing, a biasing device for keeping the storage cabinet biased constantly in an opening direction and a lock device for controlling switching motion of the storage cabinet. The storage cabinet is caused, by the operation of the lock device, to be locked at a shut position thereof inside the housing against the action of the biasing device. By pushing it into the housing, the cabinet is allowed to be released from the locked state at the shut position and automatically moved in the opening direction from an opening part of the housing. The safety function is manifested by providing the storage device with a rotary member, a device for exerting a rotary force on the rotary member in one direction, an inertia follower movable to a waiting position and an operating position, the rotary member and the inertia follower being provided on the housing, and a protuberance provided on the storage cabinet for allowing the rotary member to be rotated in the reverse direction during a release of the storage cabinet from the locked state at the shut position. The inertia follower is moved to the operating position and the rotary member is prevented from rotating in the reverse direction only during the presence of an inertial force.

4 Claims, 8 Drawing Sheets

STORAGE DEVICE FURNISHED WITH SAFETY FUNCTION

BACKGROUND OF THE INVENTION

1. Field of the Invention

This invention relates to a storage device such as is disposed on a dashboard of an automobile, and more particularly to a storage device furnished with a safety function.

2. Description of the Prior Art

Among conventional safety function-furnished storage devices of this class is the one which is disclosed in Japanese Utility Model Public Disclosure. No. 2-25332.

The conventional storage device, though not specifically shown herein, comprises a storage cabinet that is "switch-movably" supported in a housing formed on the dashboard. A biasing means exerts a spring pressure on the storage cabinet to keep this storage cabinet biased constantly in the opening direction. A cam member provided with a cam groove is disposed rotatably on the housing side, and a pin member is movable inside the cam groove of the cam member and disposed on the storage cabinet. The pin member and the cam member serve jointly as a lock means, which is characterized in that a guide piece is integrally extended from the rear terminal part of the cam member, that an inertia follower is disposed slidably on the guide piece, that a tension spring is utilized to bias the inertia follower in the direction of the rear terminal part of the cam member, and that a lack cylinder for admitting the terminal part of the inertia follower is installed at a position opposite the housing.

In the conventional storage device constructed as described above, therefore, normal use thereof is attained by pushing the storage cabinet into the housing and synchronously causing the pin member to rotate the cam member in a prescribed direction and come into engagement with the lack part of the cam groove of the cam member, with the result that the storage cabinet is locked at the shut position thereof inside the housing in spite of the spring pressure of the biasing means. When the storage cabinet, presently in the shut and locked state, is pushed further into the housing, the pin member is released from engagement with the lock part of the cam groove and the cam member is allowed to rotate in the direction of opening the lock. As a result, the storage cabinet is automatically allowed to depart from the opening part of the housing and move in the opening direction by virtue of the spring pressure of the biasing means.

When the storage cabinet which is now in the locked state at the shut position is exposed to a large inertial force arising from a collision of the automobile carrying the storage cabinet or application of sudden brakes to the automobile, the terminal part of the inertia follower disposed on the guide piece of the cam member thrusts into the lock cylinder in spite of the biasing force of the tension spring and consequently prevents the cam member from rotating in the direction of opening the lock. As a result, the possibility of the storage cabinet accidentally thrusting out of the opening part of the housing is precluded.

In the conventional storage device, therefore, since the safety function described above operates to prevent the storage cabinet from accidentally thrusting out of the opening part of the housing, the possibility of this storage device inflicting damage on the driver and the occupants of the automobile carrying the storage device is nil, notwithstanding that the operating direction in which the storage cabinet is released from the lock at the shut position is identical with the direction in which the inertial force is generated as during a collision.

Since the conventional storage device, for the purpose of acquiring the safety function capable of utilizing the operation of the inertial force in preventing the storage cabinet from accidentally thrusting out of the housing, uses the construction causing a inertia follower to act directly on the cam member which forms the lock means in tandem with the pin member, the place for installing the inertia follower and accessorial parts thereof is limited to the lock means side. This fact entails the disadvantage that the lock means occupies an unduly large space.

Furthermore, the conventional storage device is liable to lack reliability because of the undeniable possibility that the cam member will rotate in the direction of opening the lock and accidentally expel the storage cabinet from the housing before the inertia follower moves on the guide piece when lock-opening stroke of the storage cabinet is short.

In light of the problems suffered by the conventional safety function-furnished storage device as described above, this invention has as a major object thereof the provision of a storage device which is allowed to infallibly manifest a safety function without requiring the lock means side to be unduly enlarged.

SUMMARY OF THE INVENTION

To attain the above object, according to the present invention there is provided a storage device furnished with a safety function comprising a housing containing an opening part, a storage cabinet switch-movably supported inside the housing, biasing means for keeping the storage cabinet biased constantly in an opening direction, and lock means for controlling the switching motion of the storage cabinet. The storage cabinet is caused by the operation of the lock means to be locked at a shut position thereof inside the housing in spite of the action of the biasing means, and by pushing it into the housing, allowed to be released from the locked state at the shut position and moved automatically in the opening direction from the opening part of the housing, the storage device further comprises: for manifesting the safety function, a rotary member, means for exerting a rotary force on the rotary member in one direction, an inertia follower movable to a waiting position and an operating position, the rotary member and the inertia follower being provided on the housing, and a protuberance provided on the storage cabinet for allowing the rotary member to be rotated in the reverse direction during a release of the storage cabinet from the locked state at the shut position, whereby the inertia follower is moved to the operating position and the rotary member is prevented from rotating in the reverse direction only during the presence of an inertial force.

The above and other objects, characteristic features and advantages of this invention will become apparent from the detailed description to be given hereinbelow with reference to the accompanying drawings.

DETAILED DESCRIPTION OF THE PREFERRED EMBODIMENT

The invention will now be specifically described with reference to one embodiment illustrated in the drawings.

Figure 1:
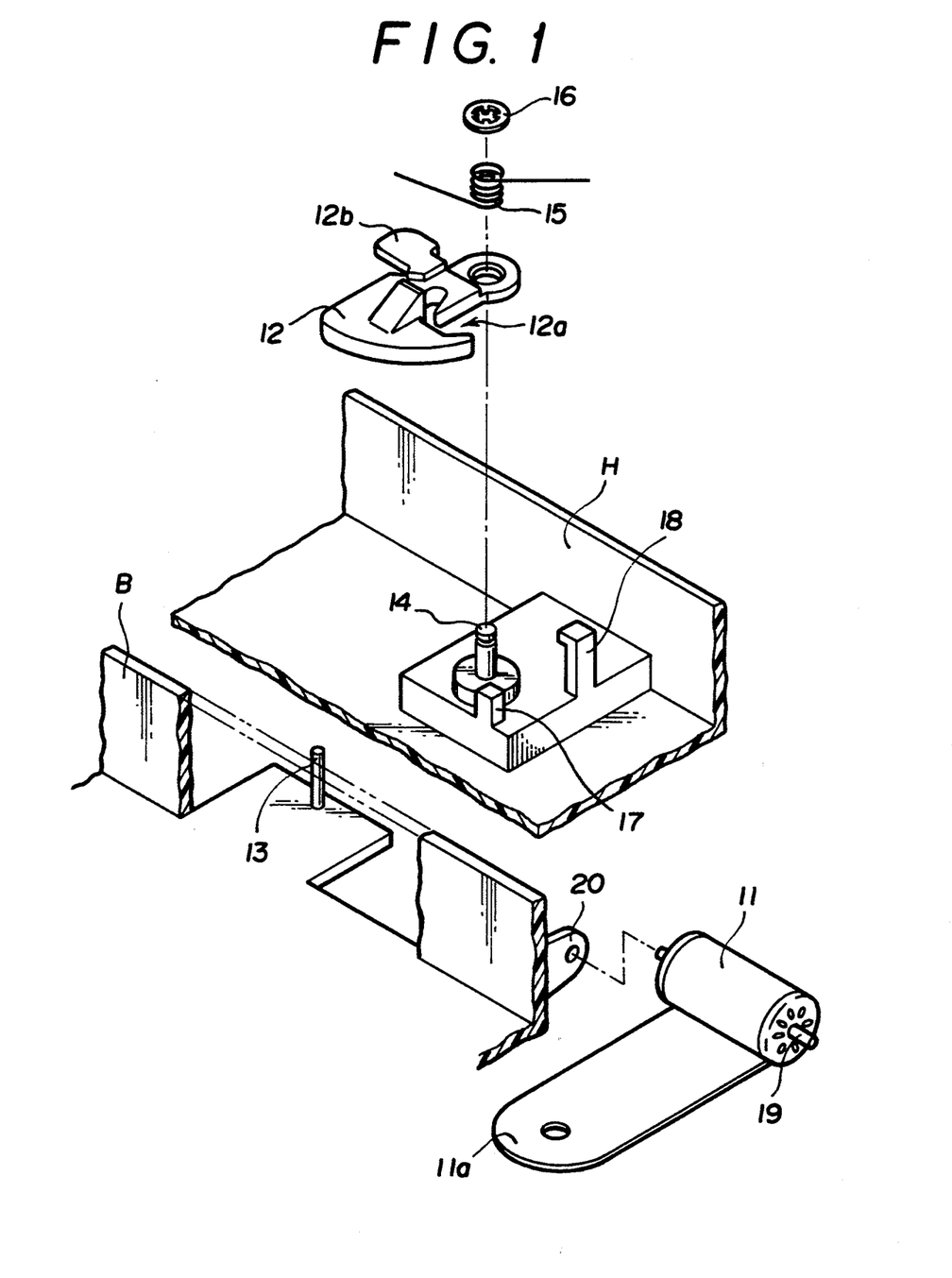
FIG. 1 is an exploded perspective view of and essential part of a storage device embodying this invention, depicting the relation of the lock means and a biasing means in a device.
Figure 8A:
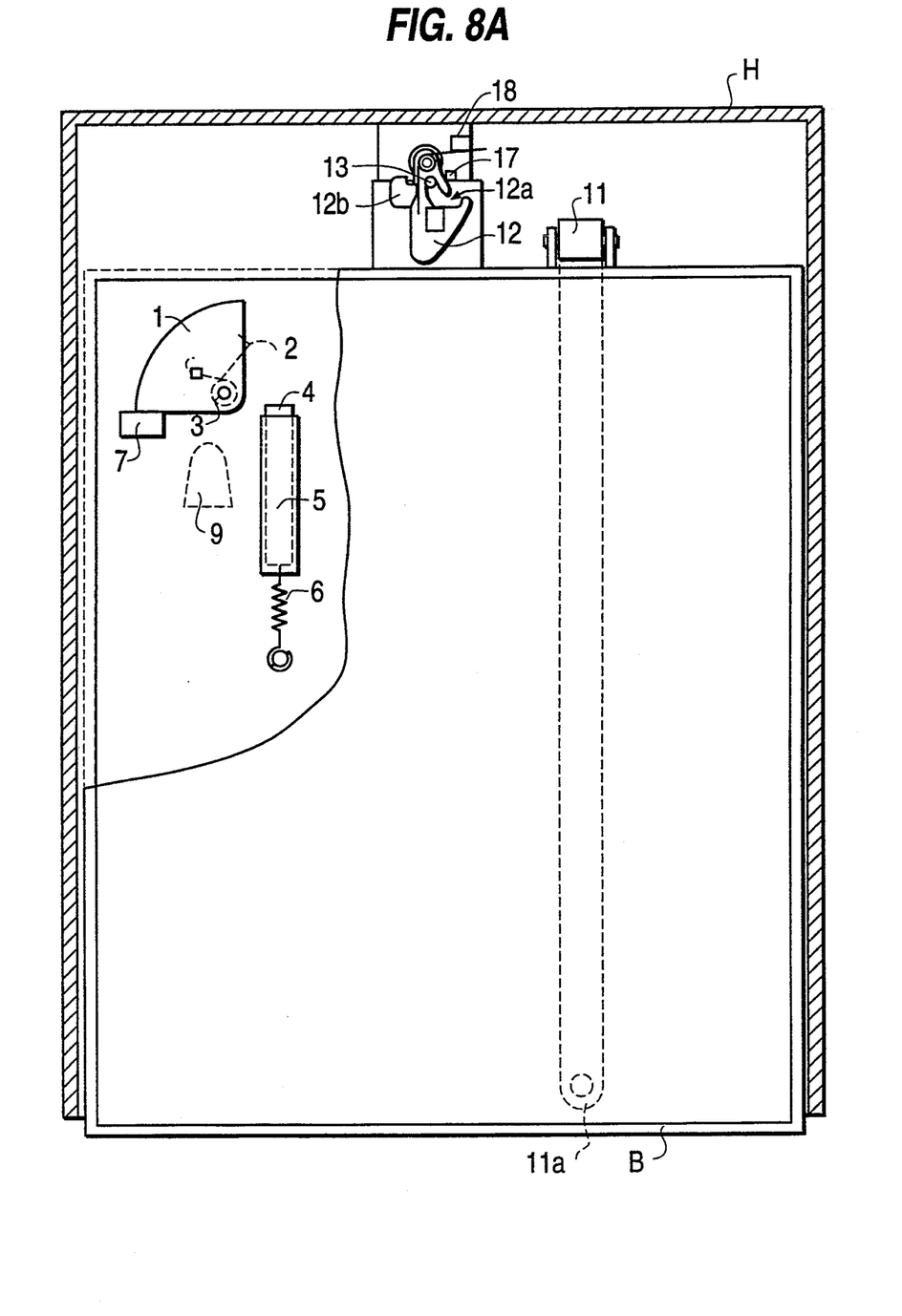
FIGS. 8A–8C are partial plan cross-sectional views of the storage cabinet and a housing in a locked state, an open state and the state in which the safety function is employed, respectively.
Figure 8B:
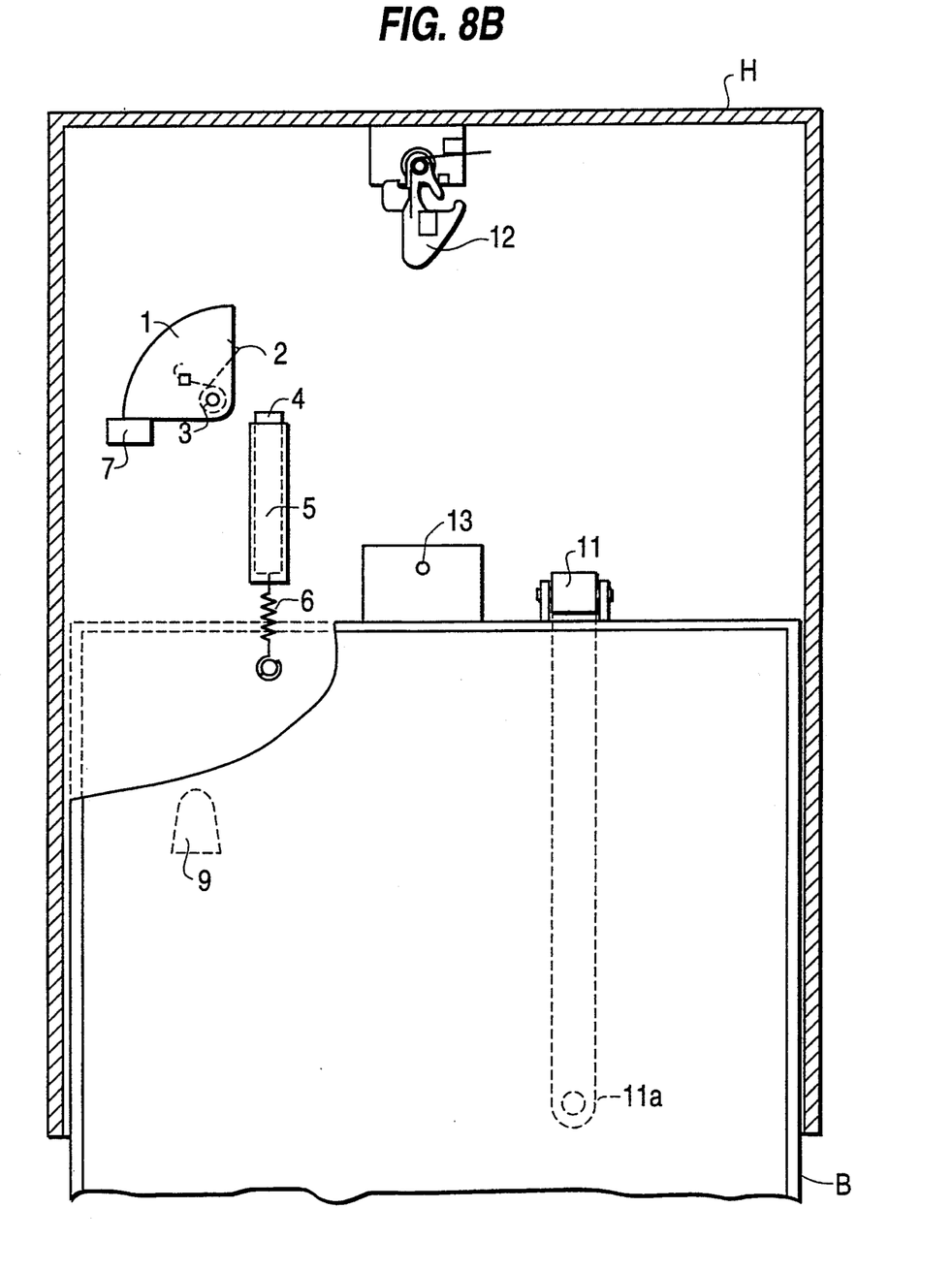
Figure 8C:
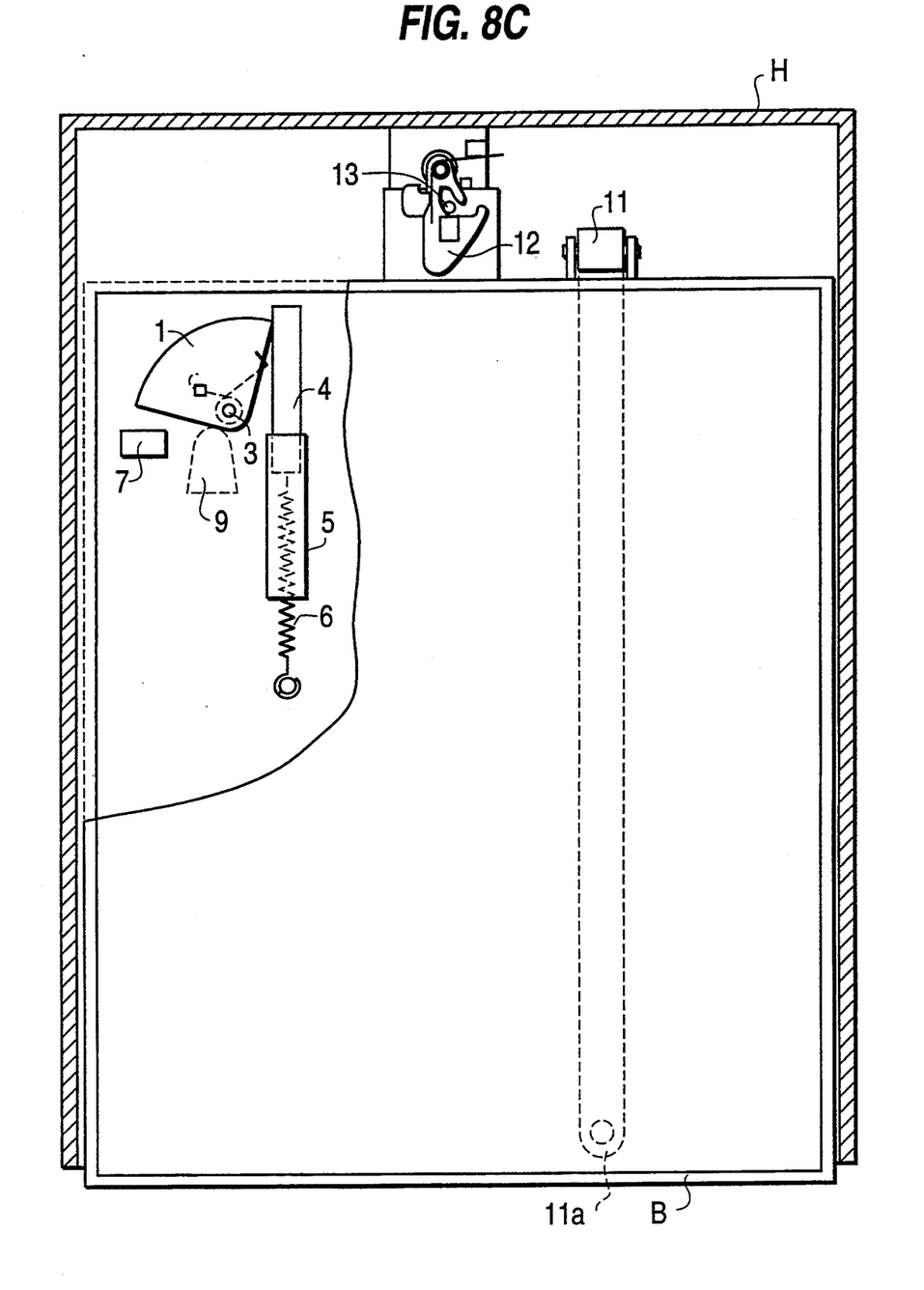

As illustrated in FIGS. 1 and 8, a storage device for an automobile in this embodiment is fundamentally constructed of a housing H formed on a dashboard, a storage cabinet B switch-movably supported inside the housing H, a constant-pressure spring 11 for keeping the storage cabinet B biased constantly in and opening direction, a cam member 12 provided with a cam groove 12a and disposed rotatably on the housing H, and a pin member 13 adapted to move inside the cam groove 12a of the cam member 12 and disposed on the storage cabinet B. The storage cabinet B is enabled by the action of a lock means formed jointly by the pin member 13 and the cam member 12 to be locked at a shut position inside the housing H in spite of the spring pressure of the constant-pressure spring 11. The storage cabinet B is allowed, by a further push of the storage cabinet B into the housing H, to be released from the locked state at the shut position created by the lock means and moved automatically in the opening direction from an opening part of the housing H by virtue of the spring pressure of the constant-pressure spring 11.

In FIG. 1, reference numeral 14 stands for a fitting shaft rotatably supporting the cam member 12 through a torsion spring 15 and a washer 16, numeral 17 for a regulating wall for regulating the position at which the cam member 12 is biased in the rotary direction, and numeral 18 for an engaging wall for securing the terminal part of the torsion spring 15 in tandem with an arm 12b of the cam member 12. The constant-pressure spring 11 functions as means for biasing the storage cabinet B by winding the spring 11 around a winding shaft 19 in the contracting direction, fixing the winding shaft 19 to the rear terminal wall of the storage cabinet B through a bearing part 20, and fixing a free terminal part 11a of the spring 11 as with screws to the bottom surface of the housing H near the opening part thereof.

The mechanism for switching the storage cabinet B is not so important for this invention. Optionally, it may be substituted by some other known mechanism which is capable of fulfilling the same function.

The present embodiment, with the construction described above as a precondition, contemplates having the parts capable of manifesting a safety function disposed in a dead space to be defined by the bottom part of the housing H and the bottom part of the storage cabinet B.

Figure 2:
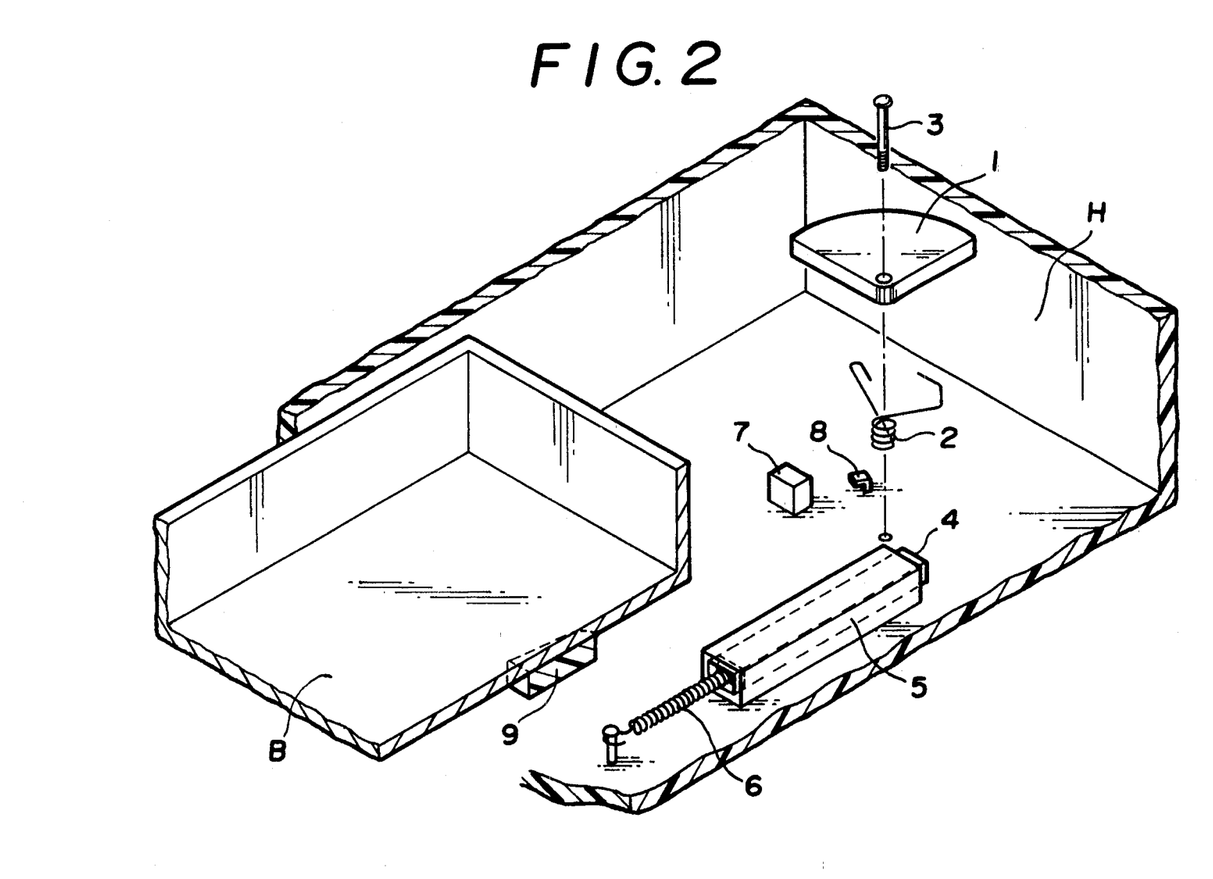
FIG. 2 is an exploded perspective view of and essential part of the storage device, depicting the relation of a safety part of the device.

To be more specific, the present embodiment is constructed, as illustrated in FIG. 2, of a sector-shaped rotary member 1 having a rotary force exerted thereon that is generated by the spring pressure of a torsion spring 2 in the counterclockwise direction as seen in the diagram and disposed rotatably by a shaft 3 at a prescribed site on the inner surface of a deep interior side of the bottom part of the housing H. An inertia follower 4 is disposed at a site near the rotary member 1 and is adapted to be moved to a waiting position and an operating position through a tubular guide wall 5. A tension coil spring 6 biases the inertia follower 4 away from the rotary member 1 toward the waiting position, and a protuberance 9 integrally formed on the outer surface of the bottom part of the storage cabinet B is adapted to rotate the rotary member 1 in the clockwise direction in the diagram in spite of the spring pressure of the torsion spring 2 when the storage cabinet B is pushed into the housing H.

In FIG. 2, reference numeral 7 stands for a stopper part for regulating the position for biasing the rotary member 1 and numeral 8 for an engaging part for securing one terminal part of the torsion spring 2. These parts 7 and 8 are formed integrally on the inner surface of the bottom part of the housing H. As a means for biasing the inertia follower 4 toward the waiting position, a compression coil spring may be used in place of the tension coil spring 6 to suit the occasion.

In any event, in the present embodiment, therefore, the rotary member 1, inertia follower 4, protuberance 9, etc., which jointly manifest the safety function, can be invariably installed simply within the dead space defined by the bottom part of the housing H and the bottom part of the storage cabinet B as completely separated from the lock means 12 and 13 described above.

Figure 3:
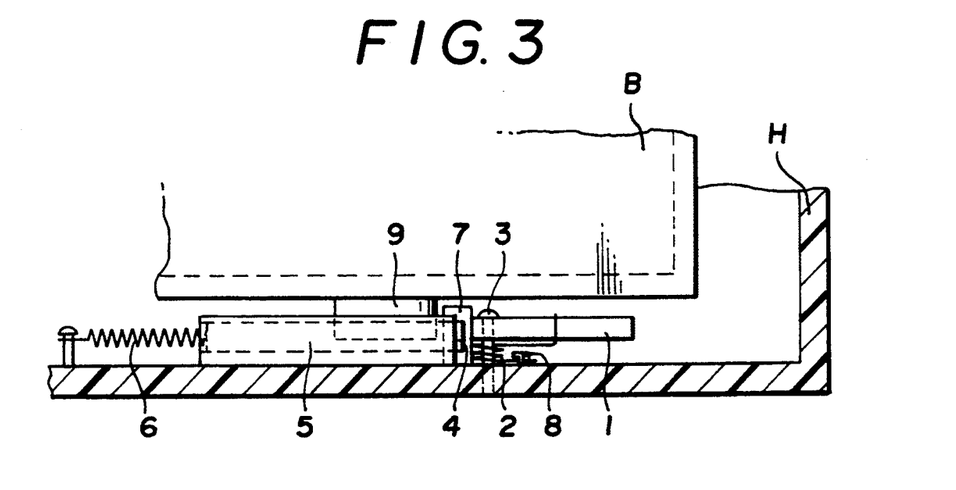
FIG. 3 is a longitudinal cross section of the essential part of the storage cabinet, depicting a locked state thereof.
Figure 4:
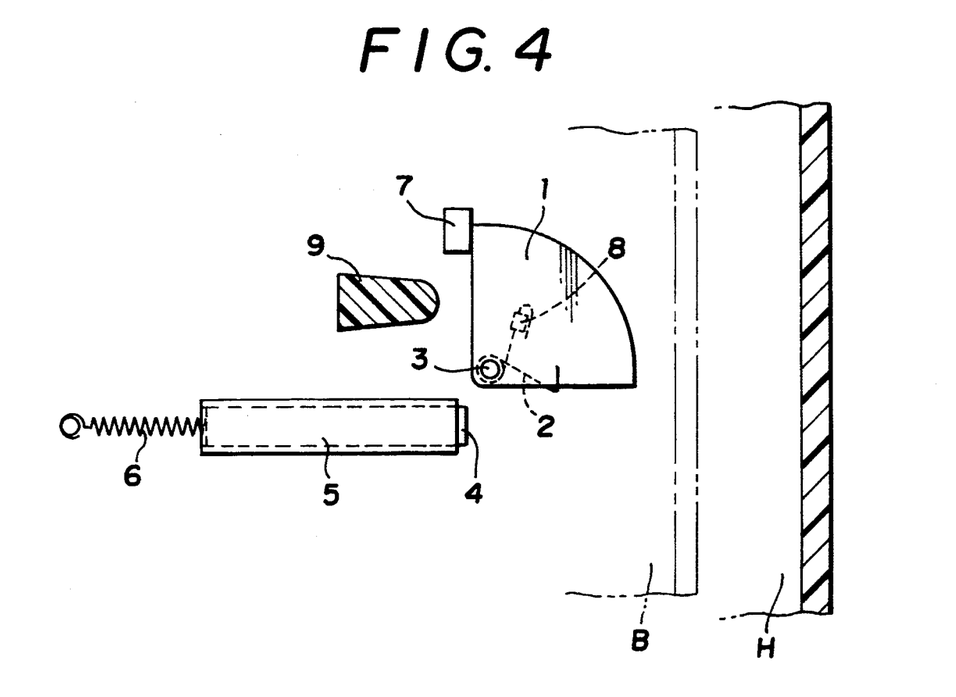
FIG. 4 is a plan cross section of the storage cabinet, depicting the locked state thereof.

In the storage device of this embodiment, therefore, when the storage cabinet B is pushed into the housing H in spite of the spring pressure of the constant-pressure spring 11 for the sake of actuating the storage device for normal service, the storage cabinet B can be infallibly locked at the shut position inside the housing H due to the operation of the lock means formed jointly by the cam member 12 and the pin member 13. While the storage cabinet B is kept locked at the shut position as described above, the sector-shaped rotary member 1 is biased by the spring pressure of the torsion spring 2 in the counterclockwise direction until collision against the stopper part 7, and the inertia follower 4 is biased by the spring pressure of the tension coil spring 6 away from the rotary member 1 toward the waiting position as illustrated in FIG. 3, FIG. 4 and FIG. 8A.

Figure 5:
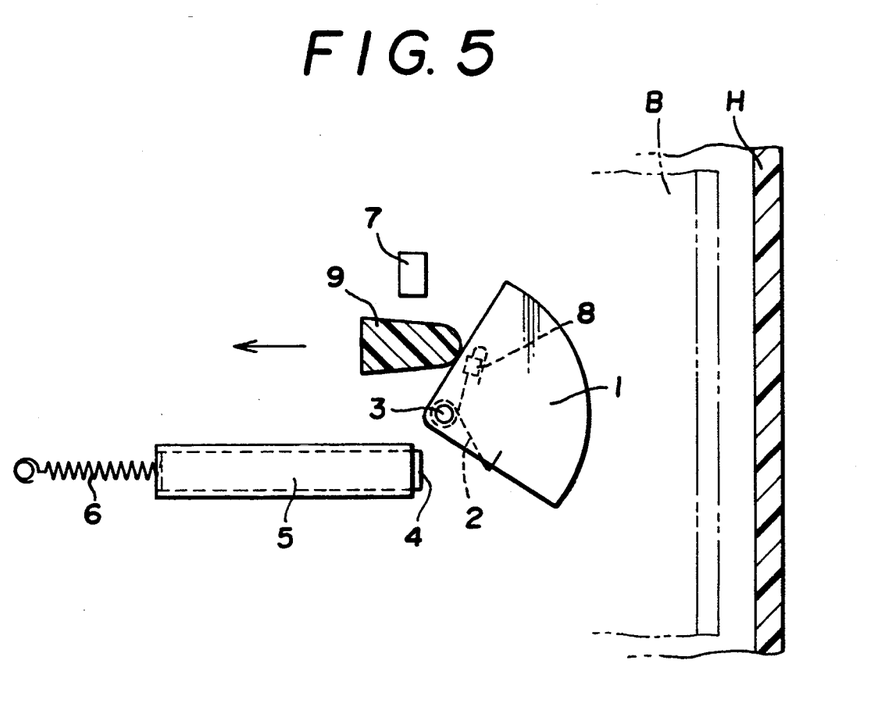
FIG. 5 is a plan cross section of the storage cabinet, depicting and unlocked state thereof.

When the storage cabinet B, kept locked at the shut position, is pushed into the housing H, the protuberance 9 provided on the storage cabinet B enables the sector-shaped rotary member 1 to be rotated in the reverse direction in spite of the spring pressure of the torsion spring 2 and permits a further push of the storage cabinet B necessary for releasing the lock means, as illustrated in FIG. 5. When the operation of further pushing the storage cabinet B is then ceased, the storage cabinet B is automatically moved by the spring pressure of the constant-pressure spring 11 in the opening direction (the direction indicated by an arrow in FIG. 5) from the opening part of the housing H. It goes without saying that the rotary member 1 is again biased in the counterclockwise direction when the storage cabinet B is moved in the opening direction. See e.g. FIG. 8B.

Figure 6:
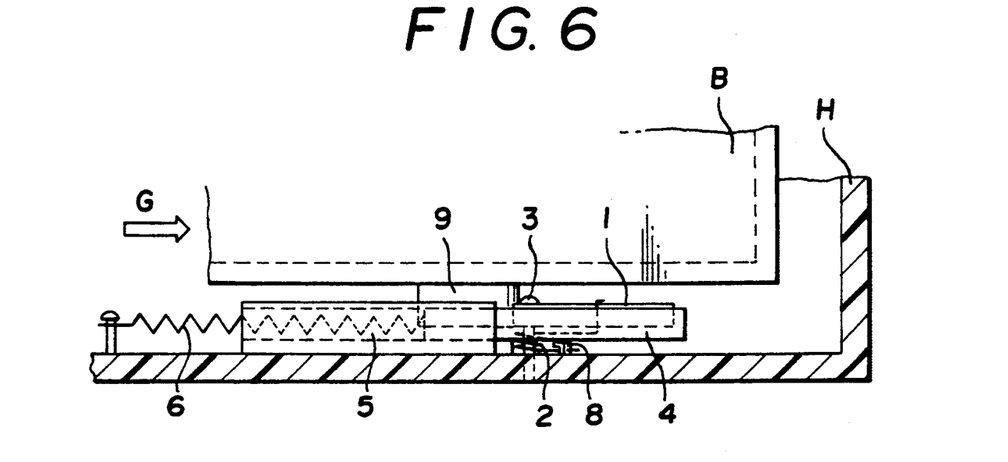
FIG. 6 is a longitudinal cross section of the essential part of the storage device, depicting the state in which the safety function operates.
Figure 7:
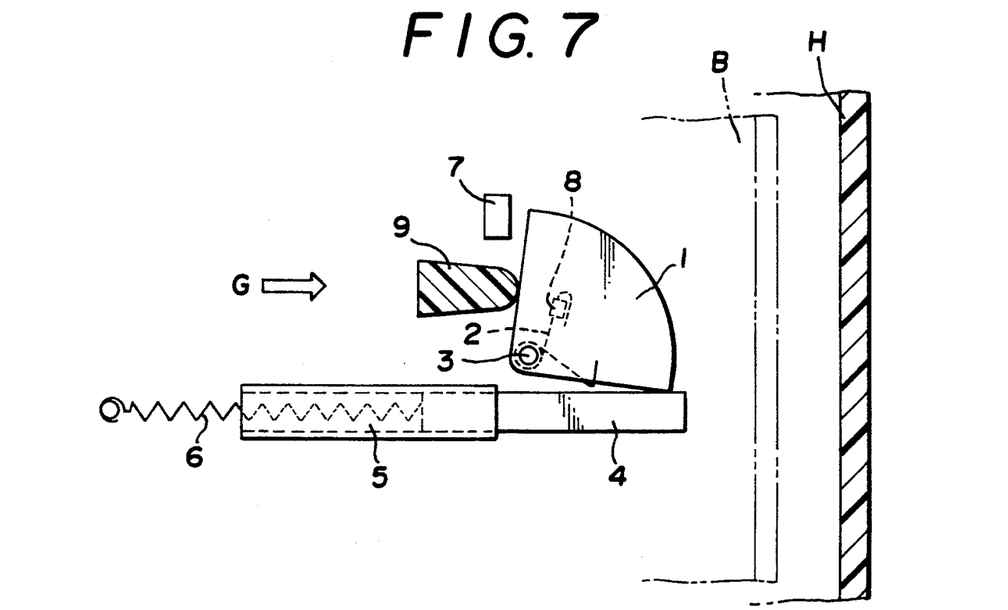
FIG. 7 is a plan cross section of the essential part of the storage device, depicting the state in which the safety function operates.

When the storage device is exposed to a large inertial force G as illustrated in FIG. 6, FIG. 7 and FIG. 8C due to a collision of the automobile or the sudden application of brakes while the storage cabinet B is kept locked at the shut position, the inertia follower 4 provided on the housing H moves from the waiting position to the operating position and is instantaneously utilized in preventing the rotary member 1 from being rotated in the direction opposite the biasing direction. When the storage cabinet B tends to be moved by the inertial force G in the direction of releasing the lock means (toward the deep interior side of the housing H), the protuberance 9 provided on the storage cabinet B collides against the rotary member 1 and infallibly prevents the storage cabinet B from being moved in the same direction over the distance necessary for releasing the lock means.

As a result, the storage cabinet B is maintained at the shut position inside the housing H and prevented from thrusting out of the housing H.

When the inertial force G mentioned above ceases to exist, the inertia follower 4 is automatically returned to the waiting position by the spring pressure of the tension coil spring 6 and the sector-shaped rotary member 1 is automatically returned to the biasing position by the spring pressure of the torsion spring 2. Thus, the normal switching operation of the storage device can be ensured.

As described above, this invention adopts a construction in which, of the parts jointly manifesting the safety function, the rotary member and the inertia follower are disposed on the housing and the protuberance is disposed on the storage cabinet, and the three parts are completely separated from the lock means. Unlike the conventional storage device, the storage device of this invention has absolutely no possibility of using a large space for the lock means. Since the adoption of the construction described above permits formation of a useful dead space between the housing and the storage cabinet, the possibility of restricting the space for storage within the storage cabinet is completely eliminated.

Further, in this invention, when the inertial force is generated, the rotary member is infallibly prevented from being rotated in the reverse direction owing to the particular construction contemplated by this invention. Thus, the storage device of this invention enjoys conspicuous improvement in reliability as compared with the conventional countertype.

What is claimed is:

1. A storage device, comprising:
    a housing having an inside bottom;
    a storage cabinet movably disposed inside said housing, said storage cabinet having an outside bottom;
    a spring constantly biasing said storage cabinet in an opening direction relative to said housing;
    a switching lock means for locking said storage cabinet in a locked state and at a shut position in said housing and for releasing said storage cabinet from the locked state at the shut position in response to said storage cabinet being pushed into said housing in a direction opposite to the opening direction such that said storage cabinet is moved in the opening direction by said spring;
    a dead space located between and defined by said inside bottom of said housing and said outside bottom of said storage cabinet in the shut position of said storage cabinet;
    a rotary member provided on said inside bottom of said housing in said dead space having a means for exerting a rotary force on said rotary force in one direction;
    an inertia follower provided on said inside bottom of said housing in said dead space, said inertia follower being movable between a waiting position and an operating position; and
    a protuberance provided on said outside bottom of said storage cabinet in said dead space, wherein said protuberance is located so as to engage and rotate said rotary member in a reverse direction opposite to said one direction when said storage cabinet is pushed into said storage cabinet to be released, and wherein said inertia follower is located so as to move to the operating position thereof to prevent said rotary member from rotating in the reverse direction only during the presence of an inertial force.

2. The storage device of claim 1, wherein said rotary member is rotatable in a plane parallel to said inside bottom of said housing, and said inertia follower is linearly movable in said plane.

3. The storage device of claim 2, wherein said inertia follower, in the operating position thereof, physically blocks rotary movement of said rotary member in the reverse direction.

4. The storage device of claim 1, wherein said inertia follower is movably disposed in a tubular guide wall on said inside bottom of said housing and biased by a spring toward the waiting position.

* * * * *